United States Patent
Hattori et al.

[11] Patent Number: 6,050,608
[45] Date of Patent: Apr. 18, 2000

[54] FITTING FOR A PLASTIC PIPE

[75] Inventors: Noriaki Hattori, Ibaraki-ken; Akira Fujii, Tokyo; Kazuhiro Sueyoshi, Yotsukaido, all of Japan

[73] Assignee: Mitsubishi Kagaku Sanshi Corporation, Tokyo, Japan

[21] Appl. No.: 08/827,112

[22] Filed: Mar. 26, 1997

[30] Foreign Application Priority Data

Apr. 8, 1996 [JP] Japan .................................. 8-084952
Jul. 30, 1996 [JP] Japan .................................. 8-199995

[51] Int. Cl.⁷ .................................................. F16L 35/00
[52] U.S. Cl. .............................. 285/39; 285/93; 285/242; 285/259; 29/237
[58] Field of Search .............................. 285/93, 39, 242, 285/259, 256; 29/237

[56] References Cited

U.S. PATENT DOCUMENTS

| | | | |
|---|---|---|---|
| 1,795,487 | 3/1931 | Grady | 29/237 |
| 2,686,066 | 8/1954 | Paquin | 285/93 |
| 3,202,022 | 8/1965 | Lothaire . | |
| 3,249,371 | 5/1966 | Peterman | 285/259 X |
| 3,262,721 | 7/1966 | Knight | 285/342 X |
| 3,426,417 | 2/1969 | Austin . | |
| 3,463,517 | 8/1969 | Courtot et al. | 285/93 |
| 4,293,147 | 10/1981 | Metcalfe et al. | 285/342 X |
| 4,330,142 | 5/1982 | Paini | 285/259 X |
| 4,666,190 | 5/1987 | Yambe et al. | 285/93 |
| 4,923,223 | 5/1990 | Seckel | 285/259 X |
| 5,226,231 | 7/1993 | Leebeeck | 29/237 |
| 5,456,144 | 10/1995 | Dahl et al. . | |
| 5,749,604 | 5/1998 | Williams | 289/39 |

FOREIGN PATENT DOCUMENTS

| | | |
|---|---|---|
| 0 598 173 A2 | 3/1993 | European Pat. Off. . |
| 530404 | 3/1993 | European Pat. Off. .................. 285/93 |
| 2 338 447 | 12/1977 | France . |
| 2 692 512 | 6/1992 | France . |
| 1 093 152 | 11/1960 | Germany . |
| 7039327 | 6/1976 | Germany . |
| 83 05 240 U | 12/1983 | Germany . |
| 3129204 C2 | 12/1989 | Germany . |
| 40 03 740 A1 | 8/1991 | Germany . |
| 93 07 957 U | 9/1993 | Germany . |
| 94 02 909 U | 9/1994 | Germany . |
| 4412813 A1 | 10/1995 | Germany . |
| 94 21 475 U1 | 2/1996 | Germany . |
| 4412813 C2 | 10/1996 | Germany . |
| 195 45 361 A1 | 12/1997 | Germany . |
| 15358 | of 1884 | United Kingdom ..................... 285/39 |
| 758809 | 10/1956 | United Kingdom ................... 285/259 |
| 793224 | 4/1958 | United Kingdom ................... 285/242 |
| 1 523 961 | 9/1978 | United Kingdom . |
| 2 287 996 | 4/1995 | United Kingdom . |

OTHER PUBLICATIONS

International Application No. WO 93/12913 dated Jul. 8, 1993.

*Primary Examiner*—Dave W. Arola
*Attorney, Agent, or Firm*—Nims, Howes, Collison, Hansen & Lackert

[57] ABSTRACT

The fitting for the present invention comprises a fitting main body and a retaining ring, in which the fitting main body comprises an inner core having a plurality of large diameter portions form on the outer circumferetial surface and a flange and having a hole disposed to the circumferential surface of the retaining ring for attracting the retaining ring put over the top end of the plastic pipe to the flange; and the retaining ring, upon attracting operation applied thereto, moves the plastic pipe to the flange accompanying the retaining ring to insert the inner core relatively to the top end of the plastic pipe. The inner core diametrically enlarges the top end portion of the plastic pipe and compresses the top end portion in cooperation with the retaining ring. Therefore, the said fitting can simply and reliably connect the plastic pipe.

4 Claims, 5 Drawing Sheets

FITTING FOR A PLASTIC PIPE

BACKGROUND OF THE INVENTION

The present invention relates to a fitting for a plastic pipe and, more in particular, it relates to a fitting for a plastic pipe comprising a fitting main body and a retaining ring put over the top end of a plastic pipe, which can simply and reliably connect a plastic pipe and easily confirm the state of operation.

As pipelines for supplying hot water and water, and pipelines for heat medium for warming a floor, fluid supplying pipes made of plastics (hereinafter referred to as plastic pipes) have been popularized with a view point, for example, of corrosion resistance, earthquake proofness, sanitation and operability. A fitting used, for example, in a case of connecting a plastic pipe to an equipment is described, for example, in Japanese Industrial Standards JIS B 2354. Such a fitting comprises a fitting main body having at one end an inner core to which the top end of a plastic pipe is inserted, a bite-type ring put over the top end of the plastic pipe and a cap nut for tightening the plastic pipe by way of the bite-type ring.

However, since the existent fitting described above comprising three parts, namely, the fitting main body, the bite-type ring and the cap nut, it is difficult to reduce the manufacturing cost and the administration cost for parts. Further, in the connecting operation, since the cap nut and the bite-type ring have to be mounted successively to the end of the pipe previously and clamped by the cap nut, there arises a problem of complicating the operation. In addition, since the top end of the plastic pipe is covered with the cap nut, there arises in a problem that complete fitting of the plastic pipe as far as a predetermined position at the base end of the inner core of the fitting main body can not be inspected directly.

As a result of the present inventions' earnest studies for (1) reduction of the number of constitutional parts, (2) simple and reliable operation, and (3) easy inspection after the operation, it has been found that by constituting the fitting with two members, that is, a fitting main body and a retaining ring having a specified structural means, such a fitting for a plastic pipe overecomes the foregoing problems. On the basis of the finding, the present invention has been attained.

SUMMARY OF THE INVENTION

An object of the present invention is to provide a fitting for a plastic pipe comprising two parts, that is, a fitting main body and a retaining ring put over the top end of a plastic pipe, which is capable of simply and reliably connecting a plastic pipe and capable of easily confirming the operation state.

To accomplish the aim, in a first aspect of the present invention, there is provided a fitting (joint) for a plastic pipe (plastic tube) comprising:

a fitting main body comprising an inner core having a plurality of large diameter portions (diametrically enlarged portions) formed on the outer circumferential surface and to be inserted to the top end of a plastic pipe, and a flange disposed to the base end of the inner core; and a retaining ring comprising a structural means to be put over the top end of the plastic pipe, and having a hole formed to the circumferential surface of the retaining ring for attracting the retaining ring put over the top end thereof with the plastic pipe to the flange.

In the fitting according to the first aspect, when the plastic pipe is mounted to the inner core of the fitting main body, the retaining ring put over the top end of the plastic pipe is attracted to the flange of the fitting main body by utilizing a hole disposed to the circumferential surface of the ring, thereby moving the top end of the plastic pipe to the flange accompanying the retaining ring and inserting the inner core relatively to the top end of the plastic pipe. Further, a plurality of large diameter portions of the inner core diametrically enlarge the top end portion of the plastic pipe to which the inner core is inserted, and compress the top end portion in cooperation with the retaining ring, thereby preventing the mounted plastic pipe from slipping off.

In a second aspect of the present invention, there is provided a fitting (joint) for a plastic pipe (plastic tube) comprising:

a fitting main body comprising an inner core having a plurality of large diameter portions (diametrically enlarged portions) formed on the outer circumferential surface and to be inserted to the top end of a plastic pipe, and a flange disposed to the base end of the inner core; and a retaining ring comprising a structural means to be put over the top end of the plastic pipe, having a hole formed at the circumferential surface thereof for attracting the retaining ring put over the top end thereof with the plastic pipe to the flange, and having a plurality of small diameter portions (diametrically reduced portions) formed to the inner circumferential surface each at an identical pitch with that of the large diameter portions of the inner core.

In the fitting according to the second aspect, as well as the fitting according to the first aspect, the retaining ring can be put easily over the top end of the plastic pipe and can secure the mounted plastic pipe. In addition, when the retaining ring is put over, since each of a plurality of small diameter portions disposed to the inner circumferential surface of the retaining ring engages a diametrical valley portion (diametrical recess portion) between the large diameter portions of the inner core, the plastic pipe can be secured more firmly.

In a third aspect of the present invention, there is provided a fitting (joint) for a plastic pipe (plastic tube) comprising:

a fitting main body comprising an inner core having a plurality of large diameter portions (diametrically enlarged portions) formed on the outer circumferential surface and to be inserted to the top end of a plastic pipe, and a flange disposed to the base end of the inner core; and a retaining ring comprising a structural means to be put over the top end of the plastic pipe, having a hole formed at the circumferential surface thereof for attracting the retaining ring put over the top end thereof with the plastic pipe to the flange, and having a plurality of small diameter portions (diametrically reduced portions) formed on the inner circumferential surface each at an identical pitch with that of the large diameter portion of the inner core, the large diameter portions of the inner core being constituted by a combination of large diameter portions each having an arcuate top end and/or large diameter portions each having an acute top end, a volume of a compressed portion of the plastic pipe compressed by the large diameter portions of the inner core, when the retaining ring put over the top end of the plastic pipe is attracted to the flange of the fitting main body, being 60 to 99% based on the volume of an uncompressed portion thereof before attraction, and the attracting operation of the retaining ring to the flange of the fitting main body being conducted by an attracting tool comprising a finger engaged to the flange of the fitting main body and a hook inserted to the hole of the retaining ring, wherein the finger and the hook are adapted so as to be brought closer or spaced apart relative to each other.

In the fitting according to the third aspect, as well as the fitting according to the first or the second aspect, the retaining ring can be put easily over the top end of the plastic pipe, and the mounted plastic pipe can be secured more firmly. In addition, the attracting operation for the retaining ring conducted by the particular tool can further improve the operability.

BRIEF DESCRIPTION OF THE DRAWINGS

FIG. 1 and FIG. 2 are partially cut away side elevational views illustrating a fitting for a plastic pipe according to the present invention, in which FIG. 1 is a view showing a state just before starting the connecting operation and FIG. 2 is a view showing a state after completing the connecting operation;

FIG. 3 and FIG. 4 are partially cut away side elevational views illustrating another embodiment of a fitting for a plastic pipe according to the present invention, in which FIG. 3 is a view showing a state just before starting the connecting operation and FIG. 4 is a view showing a state after completing the connecting operation;

DETAILED DESCRIPTION OF THE INVENTION

Figure 1:
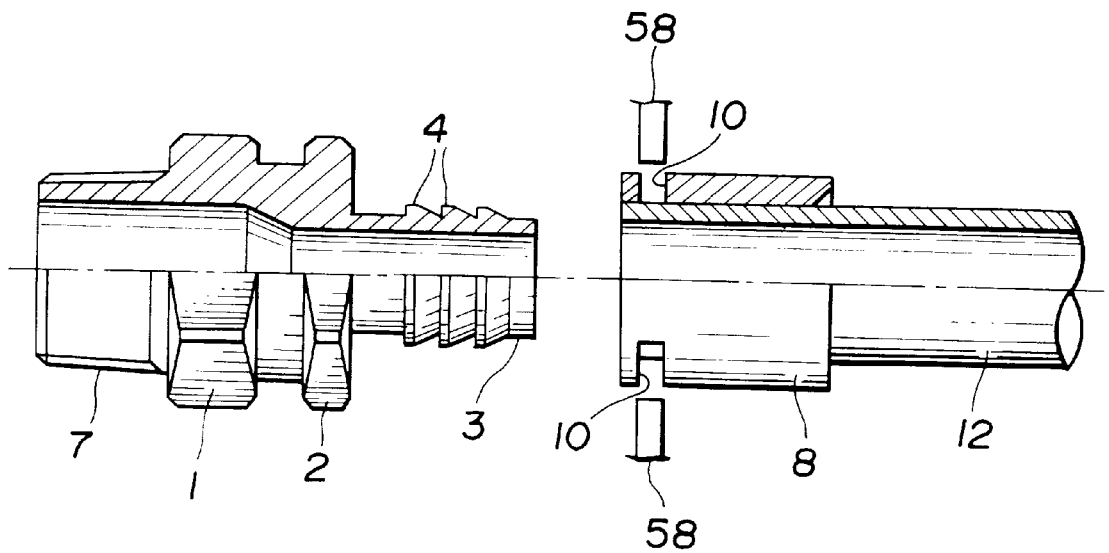
Figure 2:
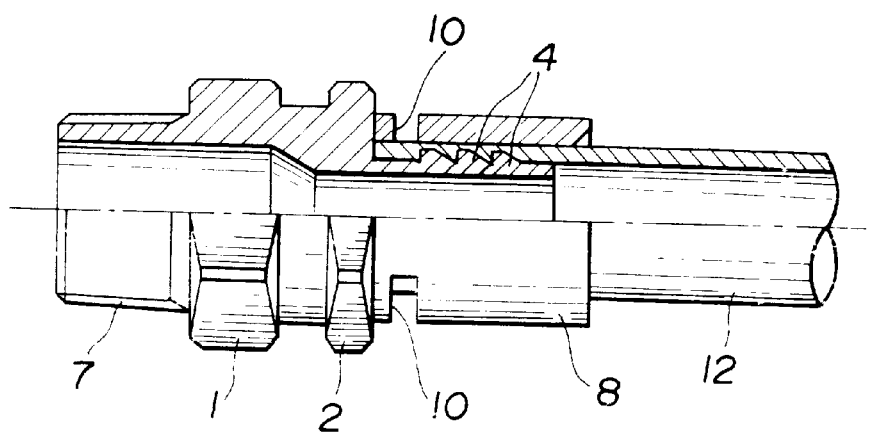

At first, a fitting for a plastic pipe according to the first aspect of the present invention will be explained. A fitting for a plastic pipe according to the first aspect of the present invention comprises, as shown in FIGS. 1 and 2, two members, that is, a fitting main body 1 and a retaining ring 8. Each of the fitting main body 1 and the retaining ring 8 is usually formed integrally, for example, by a metal material such as a copper alloy, ordinary carbon steel and stainless steel, various kinds of rigid plastics or engineering plastics. As a preferred plastic pipe for the present invention, there can be mentioned a cross-linked polyethylene pipe or polybutene pipe.

The fitting main body 1 comprises an inner core (insertion pipe) 3 having a plurality of large diameter portions (diametrically protruded portions) 4 formed on the outer circumferential surface and to be inserted to the top end portion of a plastic pipe 12, and a flange 2 disposed to the base end of the inner core. The flange 2 is an annular protrusion disposed to a body portion of the fitting main body 1 for engaging an attracting tool to be described later. The cross sectional shape of the flange 2 in perpendicular to the axis of the fitting main body 1 may be any of shapes, for example, a circular shape in addition to the illustrated hexagonal shape. The inner core 3 is a pipe for mounting the plastic pipe 12 and is disposed along the axis of the fitting main body 1 and extended to one side relative to the flange 2.

The large diameter portions 4 are usually disposed at 2 to 6 positions each at an equal interval along the extending direction of the inner core 3. The cross sectional shape of the large diameter portion 4 containing the axis of the fitting main body 1 has a flat and substantially frustconical shape large diameter gradually toward the flange 2 in order to prevent the mounted plastic pipe 12 from slipping off. The maximum diameter of the large diameter portion 4 is greater than the inner diameter of the plastic pipe 2, so that a portion at the top end of the plastic pipe is elastically deformed and large diameter when the plastic pipe 12 is put over the outside of the inner core 3. Actually, it is designed while considering the material, the inner diameter and the thickness of the plastic pipe.

Further, in the fitting main body 1, a joining portion 7 such as male threads is disposed on the side of the flange 2 opposite to the inner core for connection with other pipeline such as a steel pipe. The structural means of the fitting main body 1 on the side opposite to the inner core 3 may be such a structural means as attached directly to an equipment such as a header in addition to a fitting structure such as female threads or a union.

The retaining ring 8 has a structural means to be put over the top end of the plastic pipe 12. That is, the retaining ring 8 is formed as a straight pipe having an inner diameter allowing the top end of the plastic pipe 12 to be inserted therethrough. Such a retaining ring 8 has a function of causing the plastic pipe 12 on which the retaining ring 8 is mounted circumferentially, to move slidably to a predetermined position on the outer circumference of the inner core 3. The inner diameter of the retaining ring 8 is preferably somewhat larger than the outer diameter of the plastic pipe 12 so as to allow the top end of the plastic pipe 12 to be inserted. The thickness of the retaining ring 8 is determined while considering the material and the destruction strength based on the deformation amount of the plastic pipe 12 collectively.

In the fitting of the present invention, a through hole 10 is formed to the circumferential surface of the retaining ring 8 for attracting the retaining ring put over the top end of the plastic pipe 12 to the flange 2.

The hole 10 functions as an aperture engaged by the hook of the tool when the plastic pipe 12 is attracted along the outer circumferential surface of the inner core 3 to a predetermined position, as well as functions as an aperture slightly engaging into and retaining the plastic pipe 12 enlarged compulsorily by the outer circumferential surface of the inner core 3. Further, it also functions as an aperture for checking the connecting operation after the completion of the operation. The hole 10 is usually disposed at plural number of holes, typically, two holes considering the relation with the tool.

The hole 10 is punctured usually at a position spaced apart by 1.5 to 5 mm from the end face of the retaining ring 8. The hole 10, as viewed from the outer circumference of the retaining ring 8, may be in any appropriate shape, for example, a circular or elliptic shape in addition to the illustrated rectangular shape. Generally, the opening diameter or the opening width of the hole 10 is set within a range from 1 to 5 mm depending to the diameter, the thickness and the length of the retaining ring 8.

Further, in the fitting for the present invention, the relation for the outer diameter of the inner core 3, the inner diameter of the retaining ring 8 and the maximum diameter of the large diameter portion 4 is preferably adjusted within an actually possible range of operation so that the plastic pipe 12 can be connected firmly. That is, when the retaining ring 8 put over the top end of the plastic pipe 12 is attracted to the flange 3 of the inner core 3, a volume for a compressed portion of the plastic pipe 12 compressed by the large diameter portions 4 on the outer circumferential surface of the inner core 3 is from 60 to 99% based on the volume of an uncompressed portion thereof before attraction.

The reason why the volume of the compressed portion of the plastic pipe 12 is determined as described above by controlling the gap between the inner core 3 and the retaining ring 8, is as follows. That is, if the volume exceeds 99%, the plastic pipe can not be held firmly between the outer circumferential surface of the inner core 2 and the inner circumferential surface of the retaining ring 8. On the other hand, if the volume is less than 60%, the plastic pipe 12 has to be compressed extremely and can not be attracted to the flange 2 of the fitting main body 1. Further, depending on the case, the top end of the plastic pipe 12 may be damaged.

In the fitting for the present invention, the attracting operation of the retaining ring 8 to the flange 2 of the fitting main body 1 is preferably conducted by a particular attracting tool so that operation for the connection of the plastic pipe 12 can be conducted more simply. Such an attracting tool has a finger engaged to the flange 2 of the fitting main body 1 and a hook inserted to the hole of the retaining ring, and the finger and the hook are adapted so as to be brought closer or spaced apart relative to each other.

Figure 5:
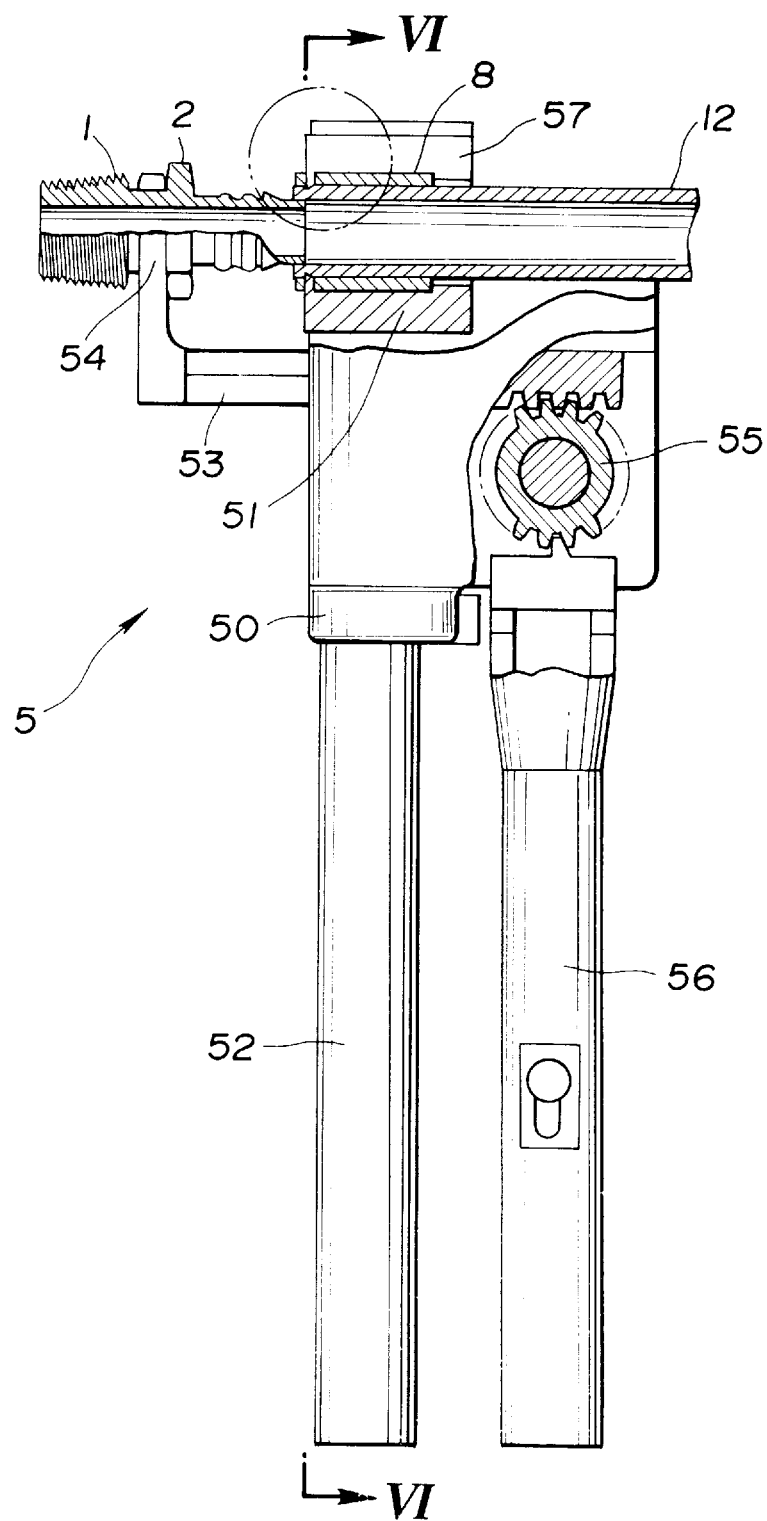
FIG. 5 is a partially cut away side elevational view illustrating an example of a structural means in an attracting tool used for connecting a plastic pipe.
Figure 6:
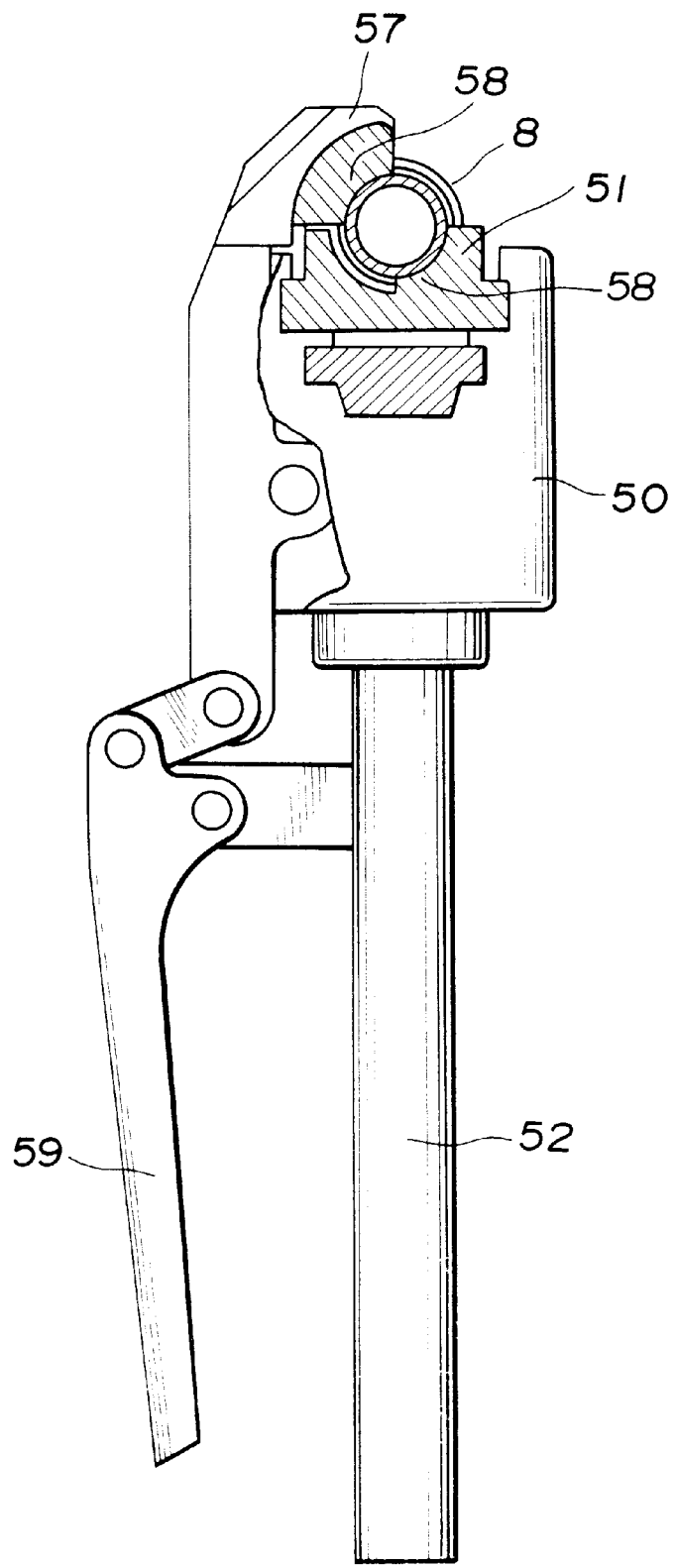
FIG. 6 is a front elevational view of the attracting tool of FIG. 5.
Figure 7:
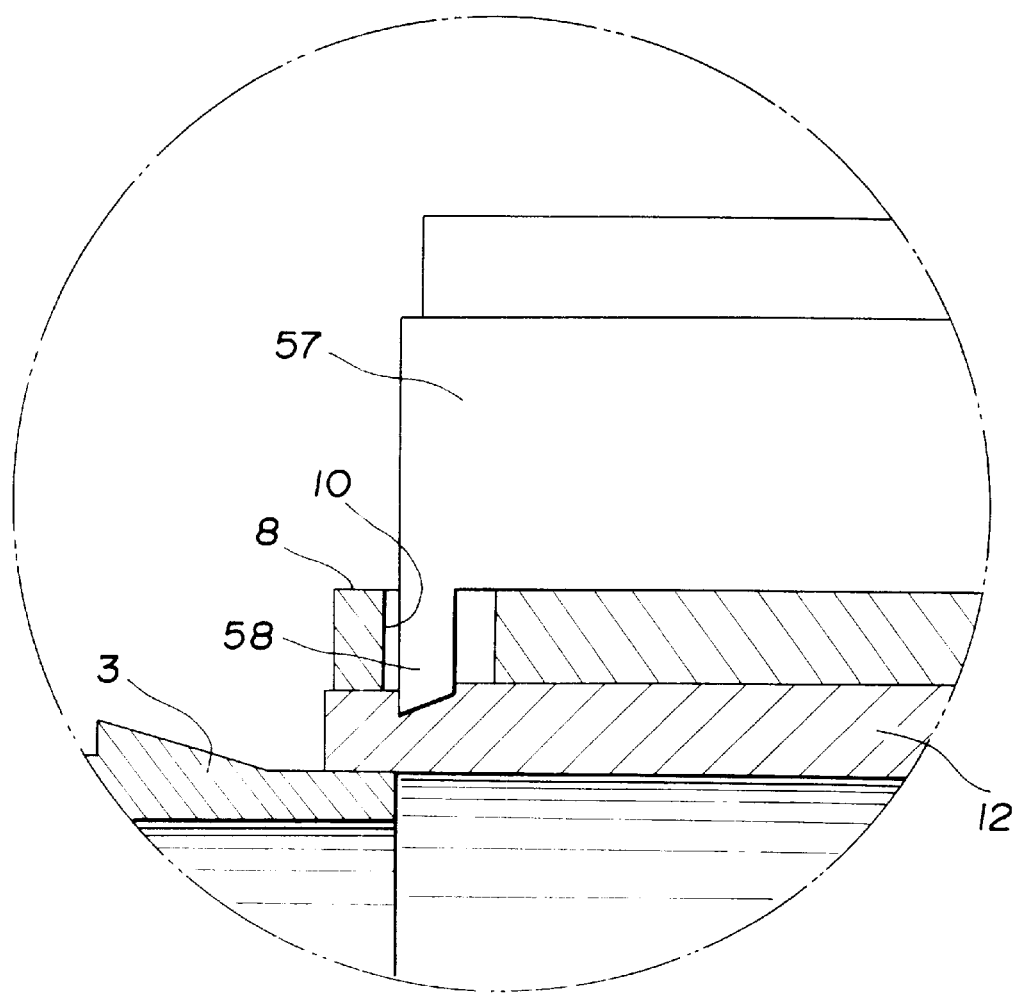
FIG. 7 is an enlarged view for a main portion showing a hook of the attracting tool of FIG. 5.

Specifically, the attraction tool shown by reference numeral 5 in FIGS. 5, 6 and 7 comprises a main body 50 comprising a holder 51 for holding one-half circumferential portion of the retaining ring 8 and a grip 52 extending below the holder 51; an attracting arm 53 assembled to the main body 50 retractably along the axial direction of the retaining ring 8 held to the holder 51 and engaging the flange 2 of the fitting main body 1; a sun gear 55 disposed to the inside of the main body 50 and meshing a rack gear at the base end of the attracting arm 53; an operation lever 56 disposed swingeably to the main body 50 and rotating the sun gear 55 by a pin protruded at the top end; a retaining arm 57 attached on the side of the main body 50 rotatably in a direction perpendicular to the axis of the retaining ring 8 held to the holder 51 and securing the retaining ring 8 on the holder 51; and a retainer lever 59 swingeably disposed on the side of the main body 50 substantially in parallel with the grip 52 and rotating the retaining arm 57 by way of a link.

In the attracting tool 5 described above, the retaining arm 57 secures the retaining ring 8 held to the holder 51, as well as engages the hole 10 of the retaining ring 8 by the hook 58 formed to the top end of the retaining arm 57. Further, the attracting arm 53 situates the fitting main body 1 coaxially with the retaining ring 8 by a forked finger 54 protruded in a direction perpendicular to the top end, and engages the flange 2 of the fitting main body 1. Then, the operation lever 56, when operated, causes the attracting arm 53 to slide. Accordingly, by the operation of the operation lever 56, the fitting main body 1 and the retaining ring 8 held together with the fingers 54 and the hook 58 can be brought closer or spaced apart from each other in a coaxial manner.

Then, the method of connecting the plastic pipe 12 to the fitting for the present invention will be explained. At first, after inserting the top end of the plastic pipe 12 through the retaining ring 8 so that the hole 10 of the retaining ring 8 situates at the top end of the plastic pipe 12, the inner core 3 is inserted to the top end of the plastic pipe 12. Then, after engaging the finger 54 and the hook 58 of the attracting tool 5 to the flange 2 of the fitting main body 1 and the hole 10 of the retaining ring 8 respectively, the finger 54 and the hook 58 are brought closer to each other by the operation of the operation lever 56 of the attracting tool 5, thereby attracting the retaining ring 8 to the flange 2 of the fitting main body 1.

When the retaining ring 8 moves slightly to the flange 2, since the top end of the plastic pipe 12 is enlarged slightly by the large diameter portions 4 at the top end of the inner core 3, the hole 10 of the retaining ring 8 engages slightly into the surface of the plastic pipe 12, thereby holding the pipe. Accordingly, the retaining ring 8 moves to the base end of the inner core 3 accompanied by the plastic pipe 12 at the inside by the attracting operation of the retaining ring 8 and, as a result, the plastic pipe 12 is mounted to the outer circumference of the inner core 3.

When the inner core 3 is inserted relatively to the top end of the plastic pipe 12, the large diameter portions 4 of the inner core 3 diametrically enlarge the top end portion of the plastic pipe 12 into which the inner core 3 is inserted, while the retaining ring 8 put over the top end of the plastic pipe 12 regulates the deformation of the plastic pipe 12 from the outer circumference. That is, the large diameter portions 4 of the inner core 3 and the retaining ring 8 cooperate to compress the top end portion of the plastic pipe 12 and firmly hold the plastic pipe 12.

As described above, the fitting for the plastic pipe of the present invention can simply and reliably connect the plastic pipe 12 by merely inserting the top end of the plastic pipe 12 in the retaining ring 8 and attracting the retaining ring 8 to the inner core 3 of the fitting main body 1.

Further, after the connecting operation, it can be easily confirmed whether the operation has been done satisfactorily or not through the hole 10 of the retaining ring 8. That is, if the surface of the plastic pipe 12 is observed for the entire portion of the hole 10 through the hole 10 of the retaining ring 8, it is judged that the plastic pipe 12 is inserted to the base end of the inner core 3 and the operation is satisfactory. On the contrary, if the top end of the plastic pipe 12 is observed through the hole 10 or the plastic pipe 12 is not observed at all through the hole 10, it is judged that the plastic pipe 12 is not inserted enough into the inner core 3 and the operation is not satisfactory. If the operation is not satisfactory, the procedures reverse to those of the connecting operation are conducted by the attracting tool 5, to detach the plastic pipe 12 from the inner core 3 and the operation is conducted again.

Figure 3:
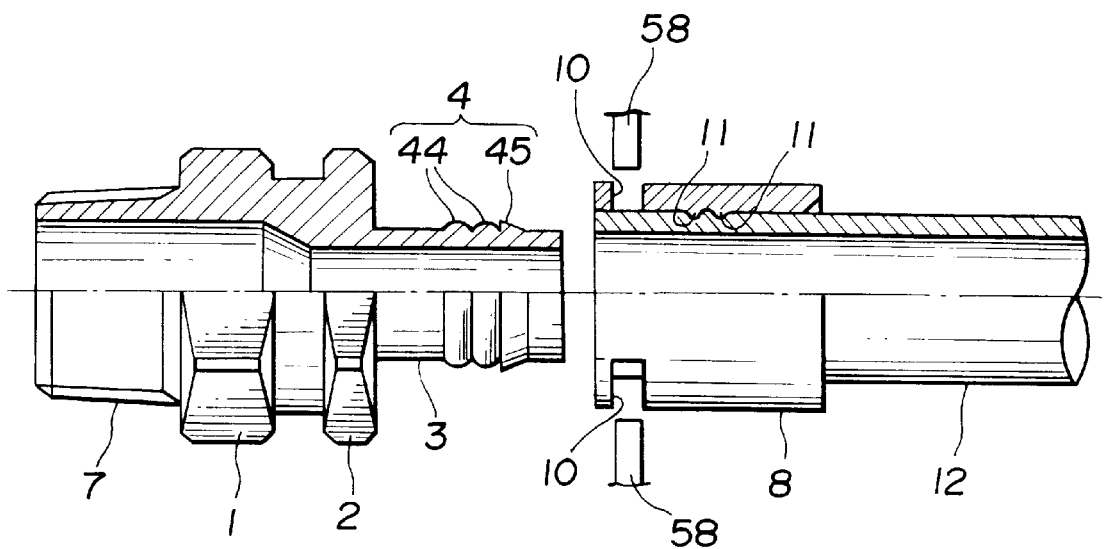
Figure 4:
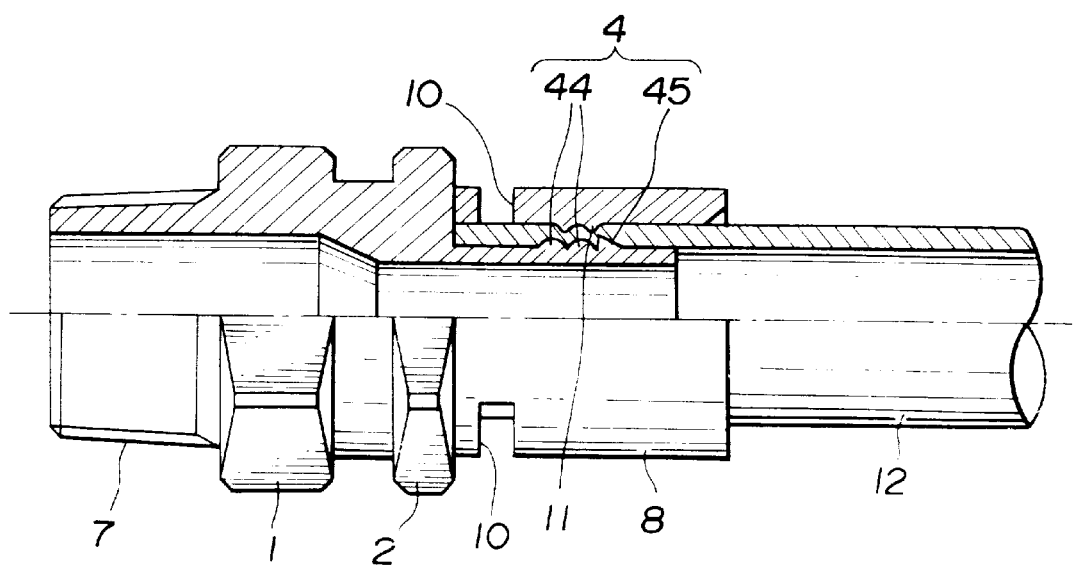

Then, the fitting for the plastic pipe according to the second aspect of the present invention will be explained. The fitting for the plastic pipe according to the second aspect of the present invention comprises, as shown in FIGS. 3 and 4, a fitting main body 1 and a retaining ring 8. The fitting main body 1 comprises an inner core 3 having a plurality of large diameter portions 4 formed on the outer circumferential surface and to be inserted to the top end portion of the plastic pipe 12, and a flange 2 disposed to the base end of the inner core. The retaining ring 8 has a structural means to be put over the top end of the plastic pipe 12. A hole 10 is disposed to the circumferential surface of the retaining ring 8 for attracting the retaining ring 8 put over the top end of the plastic pipe 12 to the flange 2. This constitution is identical with that of the fitting according to the first aspect described above.

In the fitting shown in FIGS. 3 and 4, a plurality of small diameter portions (annular protrusion portions) 11 are disposed to the inner circumferential surface of the retaining ring 8 at an identical pitch with that for the large diameter portions 4 of the inner core 3 for further enhancing the connection strength of the plastic pipe 12.

The small diameter portion 11 is usually formed as an annular projection extending over the entire circumference of the inner circumferential surface of the retaining ring 8. The small diameter portion 11 may be constituted as an assembly of spot-like protrusions each formed at a predetermined pitch in the circumferential direction on the inner circumferential surface of the retaining ring 8. Generally, a plurality of small diameter portions 11 are disposed corresponding to the recess portions between the large diameter portions 4 of the inner core 3. The width and the protruding height to the axial line of the small diameter portion 11 to the axial line are preferably made smaller than those of the large diameter portion of the inner core 3. The small diameter portions 11 are disposed to the inner circumferential surface of the retaining ring 8 each at an identical pitch with that for the large diameter portions of the inner core 3 so that the portion 11 situates being displaced from the large diameter portion 4 disposed to the outer circumferential surface of the inner core 3, that is, the portion 11 engages the recess portion between the large diameter portions 4.

In the fitting for the present invention, it is preferred that the large diameter portions 4 on the outer circumferential surface of the inner core 3 is constituted by large diameter portions 44 each having an arcuate top end and/or large diameter portions (engaging portion) 45 each having an acute top end so that the inner core 3 is easily inserted into the plastic pipe 12 by the connecting operation and the plastic pipe 12 once mounted is not easily shipping off.

More specifically, as illustrated in the drawing, among three large diameter portions 4 disposed to the inner core 3, two arcuate large diameter portions 44 are disposed on the middle portion of the inner core 3, while one acute large diameter portion 45 is disposed on the top end portion of the inner core 3. The cross sectional shape of the large diameter portion 44 containing the axis of the fitting main body 1 has substantially a semi-circular shape so as to reduce the resistance upon attracting the plastic pipe 12. The large diameter portion 45 has substantially the same shape as the large diameter portion 4 of the fitting according to the first aspect described above.

Further, the fitting of the second this aspect, as well as the fitting according to the first aspect, is preferably designed so that when the retaining ring 8 put over the top end of the plastic pipe 12 is attracted to the flange 2 of the fitting main body 1, a volume for a compressed portion of the plastic pipe 12 compressed by the large diameter portion on the outer circumferential surface of the inner core 3 is from 60 to 99% based on the volume of an uncompressed portion of the plastic pipe 12 before attraction.

In the manner of the fitting according to the first aspect, the attracting operation of the retaining ring 8 to the flange 2 of the fitting main body 1 is preferably conducted by an attracting tool 5 comprising a finger 54 engaged to the flange 2 of the fitting main body 1 and a hook 58 inserted into the hole 10 of the retaining ring 8, and adapted so that the finger 54 and the hook 58 can be brought closer and spaced apart relative to each other.

Also, in the fitting according to the second aspect, the plastic pipe 12 is connected in the same manner as that of the fitting according to the first aspect. Then, also in the connecting operation, the retaining ring 8 can be simply put over the top end of the plastic pipe 12 and reliably secured the plastic pipe 12 mounted to the inner core 3 like that the fitting according to the first aspect.

Further, in the fitting according to the second aspect, when the retaining ring 8 is attracted, a plurality of small diameter portions 11 disposed on the inner circumferential surface of the retaining ring 8 impart an anchoring effect to the outer circumferential surface of the plastic pipe 12 and the retaining ring 8 is accompanied by the plastic pipe 12 more reliably. In addition, the acute large diameter portions 45 on the top end portion of the inner core 3 prevent the plastic pipe 12 from retracting to the direction opposite to the direction of attracting the retaining ring 8, and the arcuate large diameter portions 44 smoothly move the plastic pipe 12 in which the inner core 3 is once inserted relatively. Accordingly, the connecting operation can be conducted more efficiently. Further, when the retaining ring 8 is put over the outer circumference of the inner core 3, since the small diameter portion 11 on the inner circumferential surface of the retaining ring 8 engages the recess portion between the large diameter portions 4 of the inner core 3, the plastic pipe 12 can be secured more firmly.

Then, the fitting for the plastic pipe according to the third aspect of the present invention has a preferred embodiment of the fitting according to the first and the second aspect and comprises a fitting main body 1 and a retaining ring 8 in which the fitting main body 1 comprises an inner core 3 having a plurality of large diameter portions 4 formed on the outer circumferential surface and to be inserted to the top end of the plastic pipe 12, and a flange 2 disposed to the base end of the inner core. The retaining ring 8 has a structural means put over the top end of the plastic pipe 12. A hole 10 is disposed to the circumferential surface of the retaining ring 8 for attracting the retaining ring 8 put over the top end of the plastic pipe 12 to the flange 2. A plurality of small diameter portions 11 are disposed to the inner circumferential surface of the retaining ring 8 at an identical pitch with that for the large diameter portions 4 of the inner core. The large diameter portions 4 on the outer circumferential surface of the inner core 3 comprise a combination of large diameter portions 44 each having an arcuate top end and large diameter portions 45 each having an acute top end. The large diameter portions 45 having the acute top end are disposed for the top end portion of the inner core. A volume of a compressed portion of the plastic pipe 12 compressed by the large diameter portions 4 on the outer circumferential surface of the inner core 3, when the retaining ring 8 put over the top end of the plastic pipe 12 is attracted to the flange 2 of the fitting main body 1, is from 60 to 99% based on the volume of an uncompressed portion of the plastic pipe 12 before attraction. The attracting operation of the retaining ring 8 to the flange 2 of the fitting main body 1 is conducted by an attracting tool 5 having a finger 54 to be engaged to the flange 2 of the fitting main body 1 and a hook 58 inserted into the hole 10 of the retaining ring 8, and adapted so that the finger 54 and the hook 58 can be brought closer and spaced apart relative to each other.

In the fitting for the plastic pipe according to the third aspect, as well as the fitting according to the first and the second aspects, the plastic pipe 12 can be connected simply and reliably and the state of connecting operation can be confirmed easily. Particularly, the attracting operation for the retaining ring 8 conducted by the particular attracting tool 5 can further improve the operability.

As described above, the fitting for the plastic pipe according to the present invention can provide the following excellent effects.

(1) Since the fitting comprises two parts, namely, the fitting main body and the retaining ring, the manufacturing cost and administration cost such as for storage and transportation can be reduced.

(2) Since the hole is formed to the retaining ring, the plastic pipe can be put over the inner core accompanying the retaining ring by merely attracting the retaining ring to the fitting main body by utilizing the hole, thereby conducting the operation extremely easily.

(3) Since the plastic pipe is put between the large diameter portions disposed to the inner core and the retaining ring in a compressed state, the plastic pipe can be secured reliably and firmly.

(4) Since the hole is formed to the retaining ring, the state of operation can be confirmed easily.

(5) In the fitting according to the second and the third aspects, since the plastic pipe is engaged by the small diameter portions formed to the inner circumferential surface of the retaining ring when the retaining ring is attracted, the retaining ring can be reliably accompanied by the plastic pipe to enable reliable operation.

What is claimed is:

1. A combination of a fitting for a plastic pipe and a tool for attaching the fitting to the plastic pipe comprising:

a fitting having a fitting main body having an inner core, a plurality of projecting portions formed on an outer circumferential surface of the inner core, the inner core inserted into an end of the plastic pipe, a flange disposed at a base end of the inner core, a retaining ring located over the end of the plastic pipe, means for visually inspecting the pipe end placed within the retaining ring, the inspecting means being a hole formed about a circumferential surface of the retaining ring; and, an attracting tool having a finger engageable to the flange of the fitting main body, and a hook insertable into the hole of the retaining ring, the finger and hook adapted for movement of the fitting main body and retaining ring closer or spaced apart relative to each other, the fitting assembled on an end of the plastic pipe by the attracting tool.

2. The fitting for a plastic pipe according to claim 1, wherein a volume of a compressed portion of the plastic pipe compressed between the projecting portions of the inner core and the retaining ring, is from 60 to 99% based on a volume of an uncompressed portion thereof.

3. A combination of a fitting for a plastic pipe and a tool for attaching the fitting to the plastic pipe comprising:

a fitting having a fitting main body having an inner core, a plurality of protecting portions formed on an outer circumferential surface of the inner core, the inner core inserted into an end of the plastic pipe, a flange disposed at a base end of the inner core, a retaining ring located over the end of the plastic pipe, means for visually inspecting the pipe end placed within the retaining ring, the inspection means being a hole formed about a circumferential surface of the retaining ring, the hole adapted for engaging an attracting tool therein;

a volume of a compressed portion of the plastic pipe compressed between the projecting portions of the inner core and the retaining ring being from 60 to 99% based on a volume of an uncompressed portion thereof; and an attracting tool having a finger engageable to the flange of the fitting main body and a hook insertable into the hole of the retaining ring, wherein the finger and the hook are adapted so as to move the fitting main body and retaining ring closer or spaced apart relative to each other, the fitting assembled on an end of the plastic pipe.

4. A combination of parts for a fitting for an end of a plastic pipe and a tool for attaching the fitting parts to the plastic pipe comprising:

a fitting main body having an inner core, a plurality of projecting portions formed on an outer circumferential surface of the inner core, the inner core inserted into an end of the plastic pipe, a flange disposed at a base end of the inner core, each projecting portion having either an arcuate top end or an acute top end; and, a retaining ring located over the end of the plastic pipe, means for visually inspecting the pipe end located in the retaining ring, the inspecting means being a hole formed about a circumferential surface of the retaining ring, a plurality of second projecting portions disposed on an inner circumferential surface of the retaining ring, each second projecting portion having an identical pitch to a pitch of a corresponding projecting portion of the inner core, a volume of a compressed portion of the end of the plastic pipe compressed between the projecting portions of the inner core and the second projecting portions of the retaining ring being from 60 to 99% based on the volume of an uncompressed portion thereof; and an attracting tool having a finger engageable to the flange of the fitting main body and a hook insertable into the hole of the retaining ring, the finger and the hook adapted for moving the fitting main body and retaining ring closer or spaced apart relative to each other when located on a pipe end, such that the fitting parts are assembled or disassembled on the pipe end by the attracting tool.

* * * * *